US012801147B2

(12) United States Patent
Jecker et al.

(10) Patent No.: US 12,801,147 B2
(45) Date of Patent: Nov. 17, 2026

(54) METHOD, COMPUTER PROGRAM PRODUCT, PARKING ASSISTANCE SYSTEM, AND PARKING DEVICE

(71) Applicant: VALEO SCHALTER UND SENSOREN GMBH, Bietigheim-Bissingen (DE)

(72) Inventors: Nicolas Jecker, Bietigheim-Bissingen (DE); Lasse Schnepel, Bietigheim-Bissingen (DE); Malte Joos, Bietigheim-Bissingen (DE); Ludovic Mosnier-Thoumas, Bietigheim-Bissingen (DE); Thirumalai Kumarasamy Ayyappan, Bietigheim-Bissingen (DE); Fabian Fuchs, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 148 days.

(21) Appl. No.: 18/292,625

(22) PCT Filed: Jul. 20, 2022

(86) PCT No.: PCT/EP2022/070330

§ 371 (c)(1),
(2) Date: Jan. 26, 2024

(87) PCT Pub. No.: WO2023/006539

PCT Pub. Date: Feb. 2, 2023

(65) Prior Publication Data

US 2024/0338028 A1 Oct. 10, 2024

(30) Foreign Application Priority Data

Jul. 27, 2021 (DE) ..................... 10 2021 119 420.2

(51) Int. Cl.
*G05D 1/227* (2024.01)
*B60W 30/06* (2006.01)

(52) U.S. Cl.
CPC ............. *G05D 1/227* (2024.01); *B60W 30/06* (2013.01); *B60W 2555/20* (2020.02); *B60W 2556/45* (2020.02)

(58) Field of Classification Search
CPC .. G05D 1/227; B60W 30/06; B60W 2556/45; B60W 2555/20
See application file for complete search history.

(56) References Cited

U.S. PATENT DOCUMENTS 10,322,719 B2 * 6/2019 Dudar .................. B60W 30/06
10,829,154 B2 * 11/2020 Irion .................... B60W 30/06
(Continued)

FOREIGN PATENT DOCUMENTS

CN 111223291 A 6/2020
CN 111768508 A 10/2020
(Continued)

OTHER PUBLICATIONS

Office Action issued in corresponding JP Application No. 2024-505086, dated Mar. 7, 2025 (21 pages with English Translation).
(Continued)

*Primary Examiner* — Peter D Nolan
*Assistant Examiner* — Wae L Louie
(74) *Attorney, Agent, or Firm* — Osha Bergman Watanabe & Burton LLP

(57) ABSTRACT

A method for operating a parking assistance system for a parking facility is disclosed. The parking facility provides in a predetermined area several parking spaces for autonomously driving vehicles and includes a handover area for handing over a vehicle from a user to the parking assistance system or vice versa. The method includes receiving a
(Continued)

request for the use of the parking facility in a specific time interval from the user of the vehicle. The request includes at least one handover time. The method also includes determining a first expected utilization of the parking facility at the handover time as a function of a number of utilization parameters, comparing the determined first expected utilization with a particular utilization threshold value, determining an alternate handover time, and transmitting a message including the alternate handover time to the user.

17 Claims, 5 Drawing Sheets

(56) References Cited

U.S. PATENT DOCUMENTS

| | | | | |
|---|---|---|---|---|
| 11,753,000 | B2 * | 9/2023 | Tashiro | G01C 21/34 701/26 |
| 2014/0052312 | A1 * | 2/2014 | Stadler | B60S 3/04 701/2 |
| 2017/0148325 | A1 * | 5/2017 | Schoenherr | G08G 1/096725 |
| 2019/0039604 | A1 * | 2/2019 | Auracher | B60W 30/06 |
| 2020/0031395 | A1 * | 1/2020 | Matsunaga | B60W 30/06 |
| 2020/0150657 | A1 | 5/2020 | Yoo | |
| 2020/0198620 | A1 | 6/2020 | Nakata | |
| 2020/0210731 | A1 * | 7/2020 | Yamanaka | B60W 20/13 |
| 2020/0302796 | A1 * | 9/2020 | Imazu | B62D 15/0285 |
| 2020/0311849 | A1 | 10/2020 | Noguchi et al. | |
| 2021/0142671 | A1 * | 5/2021 | Takato | G08G 1/065 |
| 2024/0338028 | A1 * | 10/2024 | Jecker | B62D 15/0285 |

FOREIGN PATENT DOCUMENTS

| | | | |
|---|---|---|---|
| CN | 111768633 | A | 10/2020 |
| CN | 112639912 | A | 4/2021 |
| DE | 102015224426 | A1 | 6/2017 |
| DE | 102017222658 | A1 | 6/2019 |
| EP | 3461722 | A1 | 4/2019 |
| JP | 2016-006605 | A | 1/2016 |
| JP | 2019026067 | A | 2/2019 |
| JP | 2020166631 | A | 10/2020 |
| JP | 2020166710 | A | 10/2020 |
| JP | 2021077196 | A | 5/2021 |
| WO | 2021095690 | A1 | 5/2021 |

OTHER PUBLICATIONS

International Search Report in corresponding International Application No. PCT/EP2022/070330, dated Nov. 15, 2022 (6 pages).

Written Opinion in corresponding International Application No. PCT/EP2022/070330, dated Nov. 15, 2022 (7 pages).

German Search Report in corresponding German Application No. 10 2021 119 420.2, dated Apr. 4, 2022 (7 pages).

Office Action issued by the Korean Patent Office for corresponding Korean Patent Application No. 2024 7006425, mailed Sep. 26, 2025 (17 pages).

Akio Yamazaki et al., "Development of Control Technology for Controlling Automated Valet Parking," Denso Ten Technical Review vol. 3 (6 pages).

Office Action issued in corresponding China Application No. 202280059858.8, dated Jun. 23, 2026. (19 pages).

* cited by examiner

METHOD, COMPUTER PROGRAM PRODUCT, PARKING ASSISTANCE SYSTEM, AND PARKING DEVICE

The present invention relates to a method for operating a parking assistance system, to a computer program product, to a parking assistance system and to a parking facility.

Vehicles that have an automated parking function are known, these being configured, in particular, for automatic parking of the vehicle in a suitable parking garage or in a suitable parking space. Such systems are referred to, for example, as automated valet parking systems. A distinction is made between two types of these. In a first type, the vehicle controls itself, with the parking garage, for example, having suitable features for orienting the vehicle, such as ARUCO codes. In a second type, the vehicle can be controlled remotely, wherein the parking garage, for example, has sensors and route planning means to control the vehicle. Between these two types, there may be different intermediate stages in which the functions are distributed differently between the vehicle and the parking garage.

An advantage of such parking assistance systems is that a user of a corresponding vehicle does not have to drive the vehicle to a parking space themselves, but can leave the vehicle, for example, at the entrance to the parking garage or the parking lot and the vehicle then drives autonomously to the parking space or is controlled remotely. This is convenient for the user and saves them time. Even when collecting the vehicle, the user does not have to search for their vehicle in the first place, which can be problematic in large parking lots or in large parking garages, since the vehicle drives autonomously to the exit on request or is controlled remotely.

DE 10 2017 222 658 A1 discloses a method for supporting driverless driving of a motor vehicle in a parking facility comprising several parking spaces, wherein the occupancy status of the parking spaces is monitored and, on the basis of this information, a parking space for a particular vehicle is determined. A route to the parking space is then determined and the vehicle is guided with remote control to the determined parking space.

However, parking lots or parking garages have a limited capacity; in particular, the number of vehicles moving in the parking lot or parking garage at the same time is limited. If too many vehicles are moving in the parking lot or in the parking garage at the same time, there may be a traffic jam because vehicles are blocking each other. Traffic jams are uneconomical, as the vehicles in the traffic jam consume energy without any benefit. In addition, a traffic jam may result in an unplanned waiting time for a user to drop off or collect their vehicle, which can reduce acceptance of such systems and frustrate the user.

Against this background, an object of the present invention is to improve the operation of a parking assistance system.

According to a first aspect, a method for operating a parking assistance system for a parking facility is proposed. The parking facility provides in a predetermined area several parking spaces for autonomously driving vehicles and comprises a handover area for handing over a vehicle from a user to the parking assistance system or vice versa. The method comprises the steps of:

- receiving a request for the use of the parking facility in a specific time interval from the user of the vehicle, the request comprising at least one handover time,

- determining a first expected utilization of the parking facility at the handover time as a function of a number of utilization parameters,
- comparing the determined first expected utilization with a particular utilization threshold value,
- determining an alternative handover time as a function of the comparison, wherein the alternative handover time is determined in such a way that a second expected utilization at the alternative handover time is lower than the first expected utilization and/or lower than or equal to the utilization threshold value, and
- transmitting a message comprising the alternative handover time to the user.

This parking assistance system has the advantage that a utilization of the parking facility is overall more uniform by virtue of the fact that suitable alternative handover times are proposed to the users of the parking facility, who can adopt these. It can also be said that the utilization of the parking assistance system and the parking facility is optimized with the cooperation of the users. The prerequisite for this is the most accurate determination possible of the expected utilization at the handover time and at the alternative handover time, as well as the determination of the utilization threshold value. By balancing the overall utilization, an average speed of vehicles in the predetermined area is increased, in particular, traffic jams in the predetermined area can be avoided. This has the advantage that energy consumption of the vehicles for movement in or through the predetermined area is reduced. This is also advantageous because the risk of collisions is reduced if the density of traffic in the predetermined area is reduced.

The parking facility, which is operated using the parking assistance system, comprises the predetermined area, which comprises, for example, a parking lot or a parking garage. The predetermined area comprises several parking spaces for autonomously driving vehicles and can additionally comprise several parking spaces for manually controlled vehicles. If the predetermined area provides parking spaces for both autonomously controlled vehicles and for manually controlled vehicles, this can also be referred to as mixed operation.

For autonomously controlled vehicles, a handover area is provided, in which a user hands the vehicle over to the parking assistance system or receives the vehicle from it. By virtue of the fact that the user hands the vehicle over to the parking assistance system or receives the vehicle from it, it is understood that the user hands the control of the vehicle over to the parking assistance system or to a driver assistance system, which is configured to control the vehicle autonomously in the parking facility, or that the user takes over the control of the vehicle again. The autonomous control process therefore starts and ends in the handover area. The handover area can comprise a number of handover positions. A handover position is, for example, a parking space where the vehicle is parked for the purpose of handover. This has the advantage that the user is not under time pressure when handing over the vehicle, but can, for example, take personal items or the like out of the vehicle before handing it over. On the other hand, when collecting the vehicle, the user can set themselves up in the vehicle, for example, fasten a child in a child seat, load shopping and/or carry out route planning, which the user can do as long as the vehicle is in the handover position. In the case of several handover positions, several vehicles can accordingly be handed over in parallel, such that no single vehicle obstructs the operation of the parking assistance system or blocks the parking facility.

The autonomously controlled vehicles may have their own autonomous control system and/or the vehicles may be controlled remotely by the parking assistance system. With their own autonomous control system, the vehicles have a suitable sensor system for environmental detection, such as ultrasound, cameras, radar, lidar and the like, as well as path planning tools and control units to control the vehicle along a planned trajectory. In the case of remotely controlled vehicles, the vehicles at least have control units to control the vehicle according to the remote-control commands of the parking assistance system. The vehicle's own sensor system for environmental detection is not necessary here, as the parking assistance system in this case detects the position and location of the vehicle using external sensors and carries out path planning based on this.

The request to use the parking facility in a specific time interval includes at least one handover time. This may be a drop-off time or a collection time. The request may optionally include both a drop-off time and a collection time and/or it includes a drop-off time and a planned parking period. In addition, the request may include further information, such as a piece of information relating to a type and/or a technical configuration of the vehicle, an urgency, a booking of a service on the vehicle to be carried out during the parking period, and more similar. For example, the urgency can be a statement that indicates the importance of a user handing over or collecting their vehicle at a specific time. The urgency can be determined by the user themselves and/or can be determined automatically on the basis of a calendar entry, such as a doctor's appointment or the like.

The request is received, for example, via a communication network, in particular a wireless data network, such as a WLAN, a mobile network or the like. In particular, the request can be transmitted over the Internet.

The specific time interval is determined, in particular, by the handover time. For example, the specific time interval includes the handover time with some buffer before and after the handover time.

Based on the handover time, a first expected utilization of the parking facility at the handover time or in the specified time interval is determined depending on a number of utilization parameters. The utilization parameters include, for example, empirical values, a number of vehicles already booked, known restrictions at the handover time and more similar. The utilization can be determined differently for a handover of the vehicle and a collection of the vehicle. For example, the utilization can be determined by a percentage. However, the utilization can also be determined by several different values affecting different characteristics of the utilization and characterizing the overall utilization. As an alternative or in addition, the utilization for different areas of the parking facility can be determined separately, such as, for example, a utilization of the handover area, a utilization of the parking spaces provided, a utilization of a lane and the like.

The first expected utilization determined in this way is compared with a specific utilization threshold value. The utilization threshold value may be a value that is characteristic of the respective parking facility. The utilization threshold value may be a fixed predetermined value or it may be specified on the basis of specific information relating to the parking facility and/or to the vehicles using the parking facility or located in the predetermined area. In particular, if the utilization threshold value is specified on the basis of specific information, it is to be expected that the flow of traffic in the parking facility will decrease sharply if the utilization threshold value is exceeded. For example, the average speed of the vehicles in the parking facility then falls disproportionately compared to the increase in utilization. This can cause a traffic jam to form in the predetermined area.

If the utilization is specified by several values, provision may be made for each of these values to have its own utilization threshold value specified. In addition, the utilization threshold values can be related and/or mutually affected for different values.

The determined first expected utilization is compared with the specific utilization threshold value. In this case, for example, a comparison result is determined. The comparison result can be specified here in binary form, that is to say it is determined whether the utilization is above or below the threshold value (the case that the utilization is equal to the threshold value can optionally be assigned to one of the two options). As an alternative or in addition, the magnitude of the difference between the expected utilization and the threshold value can be determined as a comparison result.

An alternative handover time is determined depending on the comparison or the comparison result. In the event that the determined first expected utilization is above the specific utilization threshold value, an alternative handover time is determined. In the event that the determined first expected utilization is below the specific utilization threshold value but is, for example, within a predetermined variation interval in relation thereto, an alternative handover time is also preferably determined. In embodiments, the determination of an alternative handover time can be dispensed with if the determined first expected utilization is significantly below the specific utilization threshold value.

If the utilization is determined by multiple values, it may be sufficient for one of the values to be above the utilization threshold value specified for this value or within a corresponding predetermined variation interval in relation thereto. The alternative handover time is determined in such a way that a second expected utilization at the alternative handover time is lower than the first expected utilization. The alternative handover time is particularly preferably determined in such a way that the second expected utilization is lower than or equal to the utilization threshold value. It should be noted that it is also possible to determine several alternative handover times that meet these criteria. If the request of the user additionally includes a statement indicating that the user is willing to accept an alternative handover time before the desired handover time or after the desired handover time, the alternative handover time can be determined in accordance with this statement.

It should be noted that the alternative handover time can include not only a precise time, but also a period of time. For example, the alternative handover time can be the period between 9:00 and 10:00 in the morning, if the second expected utilization is below the utilization threshold value during this period.

The alternative handover time is transmitted to the user in a message. The user can then accept the alternative handover time, for example, which balances the utilization of the parking facility. If the user does not accept the alternative handover time, as this is inconvenient for them, for example, it may be provided that the user is informed of an expected waiting time, since the utilization of the parking facility at the handover time selected by the user is above the utilization threshold value.

If several alternative handover times have been determined, all of these can be transmitted to the user by means of the message and can be output to the user, for example, in the form of a list. This gives the user the opportunity to select an alternative handover time that best suits their needs.

Overall, the proposed method thus allows the utilization of the parking facility to be evenly distributed, including the users, and in particular to avoid the utilization being above the utilization threshold value. The operation of the parking facility is thus improved overall by the parking assistance system, which advantageously results in lower energy consumption and an improved user experience. The proposed method thus provides the technical effect that energy savings can be achieved and that the flow of traffic can be improved and thus the risk of accidents can be reduced by promoting the most even utilization of the parking facility possible.

According to one embodiment of the method, it comprises:

determining an expected handover period, which is an estimated period of handing over the vehicle from the user to the parking assistance system or vice versa at the handover time, depending on the determined first expected utilization, wherein the message additionally comprises the determined expected handover period.

The expected handover time can also be referred to as the expected waiting time.

According to a further embodiment of the method, it comprises:

determining an alternative expected handover period, which is an expected period for handing over the vehicle from the user to the parking assistance system or vice versa at the determined alternative handover time, depending on the determined second expected utilization, wherein the message additionally comprises the determined alternative expected handover period.

According to a further embodiment of the method, it comprises:

determining a difference between the determined expected handover period and the determined alternative expected handover period, wherein the message additionally comprises the determined difference or only comprises the alternative handover time and the determined difference.

In embodiments, for example, the expected handover period at the handover time and the expected handover period at the alternative handover time as well as the difference between them is determined. The message to the user includes the alternative handover time and the determined difference, or the message includes the alternative handover time and the determined handover period and the determined difference or the message includes the alternative handover time and the determined alternative handover period and the determined difference. These embodiments differ, in particular, in the information included in the message to the user.

According to a further embodiment of the method, the utilization parameters for determining the expected utilization of the parking facility comprise an expected number of vehicles using the parking facility and/or moving through the predetermined area in the time interval or a partial interval of the time interval; and/or at least one further received request for the use of the parking facility by another user; and/or a piece of information regarding a type and/or a configuration of a further vehicle using the parking facility and/or moving through the predetermined area in the time interval; and/or a time of day of the handover time; and/or a weather forecast relating to a specific period of time; and/or a public or private event planned within a predetermined period; and/or services booked by other users of the parking facility within the time interval; and/or learned statistics relating to the utilization.

The expected utilization can be estimated very accurately on the basis of the aforementioned utilization parameters.

The expected number of vehicles using the parking facility in the time interval or a partial interval of the time interval and/or moving through the predetermined area is in this case one of the most important utilization parameters, since the number ultimately determines a traffic density in the predetermined area and thus also significantly influences the risk of traffic jams.

The information regarding the type and/or technical configuration of the further vehicle can be determined, for example, on the basis of a chassis number or a vehicle identification number. This information may have been received by the further vehicle, for example, in the context of a request by the user of the further vehicle. The type and/or technical configuration of the further vehicle may have an influence on how quickly the further vehicle can move in the predetermined area, especially when it performs driving maneuvers in confined spaces. For example, a maximum steering angle, a turning circle, the presence of rear axle steering, an existing sensor system and the like can play a role here.

A weather forecast can have an influence on an expected volume of traffic, depending on the location of the parking facility. In the event of poor weather conditions, a volume of traffic in the city, and thus the demand for parking spaces, may be increased. In recreational areas, on the other hand, an increased volume of traffic can be expected with good weather conditions.

Planned events, such as sporting events or cultural events, can also lead to increased demand for parking spaces. The predetermined period taken as a basis here may be before the handover time or after the handover time or may include the handover time.

Provision may be made for the parking facility to offer certain services that are carried out during a period where a vehicle is parked, such as, for example, vehicle cleaning, a general inspection, an exhaust gas test, a repair, a wheel change and more similar. The use of a service increases the utilization of the parking facility, as the vehicle in question must move through the predetermined area to reach the position where the service is provided.

According to a further embodiment of the method, the utilization threshold value is determined dynamically depending on parameters defined by the infrastructure of the parking facility, depending on a type and/or a technical configuration of at least one other vehicle using the parking facility in the time interval and/or located in the predetermined area, and/or depending on current and/or restrictions of the parking facility planned in a predetermined period.

This is advantageous because the utilization threshold value is not rigidly fixed, but can be determined dynamically. Parameters defined by the infrastructure of the parking facility include, for example, a lane width, dimensions of the parking spaces, a measure of how "angled" the predetermined area is, a number of existing handover positions and more similar. Current restrictions and/or restrictions planned in a predetermined period of the parking facility include, for example, planned construction or repair work in the predetermined area, a stationary vehicle or the like.

For example, the fact that the utilization threshold value is determined dynamically is understood to mean that it is determined each time a request is received, and/or that it is determined regularly, such as every day, hour, or minute, and/or that it is re-determined in a manner driven by events, for example, if a new event is scheduled, if the weather forecast changes, if a traffic jam is detected in the predetermined area, and more similar.

According to a further embodiment of the method, the utilization threshold value corresponds to a utilization of the parking facility in which an average speed of vehicles using the parking facility and/or moving through the predetermined area is lower than a predetermined speed.

As an alternative, the utilization threshold value may be determined in relation to an average period of a parking operation.

In order to determine the utilization threshold value as mentioned above, a respective simulation can be carried out for a particular parking facility whose infrastructure is specified. The simulation in this case simulates, for example, the flow of traffic at different traffic densities, in the presence of different types of vehicles and vehicles with different technical configurations and the like.

According to a further embodiment of the method, the request for the use of the parking facility comprises at least one drop-off time and a parking period or a drop-off time and a collection time.

According to a further embodiment of the method, the request for the use of the parking facility comprises a piece of information relating to a type and/or a piece of information about a technical configuration of the vehicle.

The information includes, for example, a chassis number of the vehicle and/or a list of configuration codes.

According to a further embodiment of the method, it comprises:

receiving a new request from the user in response to the transmission of the message to the user, wherein the new request comprises a different handover time to the first request.

The different handover time corresponds, in particular, to the determined alternative handover time.

According to a second aspect, what is proposed is a computer program product that comprises commands that, when the program is executed by a computer, prompt said computer to carry out the method according to the first aspect.

A computer program product, such as a computer program means, may be provided or delivered, for example, as a storage medium such as a memory card, a USB stick, a CD-ROM, a DVD, or in the form of a downloadable file from a server in a network. This may take place for example in a wireless communication network by transmitting a corresponding file containing the computer program product or the computer program means.

According to a third aspect, a parking assistance system for a parking facility is proposed. The parking facility provides in a predetermined area several parking spaces for autonomously driving vehicles and comprises a handover area for handing over a vehicle from a user to the parking assistance system or vice versa. The parking assistance system comprises:

a reception unit for receiving a request for the use of the parking facility at a specific time interval from the user of the vehicle, the request comprising at least one handover time, a determination unit for determining a first expected utilization of the parking facility at the handover time as a function of a number of utilization parameters, a comparison unit for comparing the determined first expected utilization with a specified utilization threshold value, wherein the determination unit is additionally configured for determining an alternative transfer time as a function of the comparison, wherein the alternative transfer time is determined in such a way that a second expected utilization at the alternative transfer time is less than the first expected utilization and/or less than or equal to the utilization threshold value, and a transmission unit for transmitting a message comprising the alternative transfer time to the user.

This parking assistance system has the same advantages as described for the method according to the first aspect. The embodiments and features described according to the first aspect for the proposed method apply accordingly to the proposed parking assistance system. The parking assistance system is preferably operated in conjunction with a parking facility and with a method according to the first aspect.

Each of the units of the parking assistance system may be implemented in hardware and/or software. In the case of an implementation in hardware, the respective unit may be in the form of a computer or a microprocessor, for example. In the case of an implementation in software, the respective unit may be in the form of a computer program product, a function, a routine, an algorithm, part of a program code, or an executable object.

According to a fourth aspect, a parking facility, which provides in a predetermined area several parking spaces for autonomously driving vehicles and comprises a handover area for handing over a vehicle from a user to a parking assistance system or vice versa, wherein the parking assistance system is designed according to the third aspect.

According to one embodiment of the parking facility, the parking assistance system is designed as a type 2 valet parking assistance system and comprises a plurality of sensor units arranged in the predetermined area for detecting the vehicles present in the predetermined region and for outputting a respective sensor signal. The parking assistance system comprises a control unit configured for remote control of a vehicle based on the sensor signals output by the sensor units.

The term type 2 valet parking assistance system is understood in the present case to mean that the parking assistance system comprises a sensor system arranged in the infrastructure as well as path planning means and is set up to control vehicles in the predetermined area remotely. Type 2 valet parking systems are advantageous because the vehicles that use them do not have to have any complex sensor technology and control logic, but only have to be set up to be able to be controlled remotely.

The sensor units include, for example, cameras, lidars, radars and the like.

According to a further embodiment of the parking facility, the parking assistance system is designed as a type 1 valet parking assistance system and comprises a plurality of optically detectable and clearly distinguishable markers arranged at certain positions in the predetermined region, which markers can be used by an autonomously controlled vehicle during an autonomous journey within the predetermined region for position determination.

The term type 1 valet parking assistance system is understood in the present case to mean that the parking assistance system itself does not comprise any sensor system or at least does not include a sufficient sensor system to safely control vehicles remotely, but that the vehicles have a corresponding sensor system and navigate automatically through the predetermined area on the basis of the optical markers. For example, the optical markers include ARUCO codes.

In embodiments of the parking facility, the parking assistance system is simultaneously designed as a type 2 valet parking assistance system and as a type 1 valet parking assistance system.

This means that the parking assistance system has both the features of the type 2 valet parking assistance system and the features of the type 1 valet parking assistance system. This parking assistance system can then be used both by remote-controlled vehicles without their complex own sensor systems and control logic as well as by autonomous vehicles with a suitable sensor system and control logic for autonomously controlled driving based on the optical features.

According to a fifth aspect, a method for operating a parking assistance system for a parking facility is proposed. The parking facility provides in a predetermined area several parking spaces for autonomously driving vehicles and comprises a handover area for handing over a vehicle from a user to the parking assistance system or vice versa. The method comprises the steps of:

- receiving a request for the use of the parking facility in a specific time interval from the user of the vehicle, the request comprising at least one handover time,
- determining a first expected utilization of the parking facility at the handover time as a function of a number of utilization parameters,
- determining an expected handover period, which is an estimated period of handing over the vehicle from the user to the parking assistance system or vice versa at the handover time, depending on the determined first expected utilization, and
- transmitting a message comprising the expected handover period to the user.

This has the advantage that the user is informed about the expected handover period at the desired handover time. The user can then, for example, suggest an alternative handover time themselves or they can request alternative handover times from the parking assistance system. The parking assistance system may be set up to determine alternative handover times, as explained, for example, on the basis of the first aspect. The embodiments and features described according to the first aspect for the proposed method apply accordingly to the proposed method according to the fourth aspect.

Further possible implementations of the invention also comprise not explicitly mentioned combinations of features or embodiments described above or below with regard to the exemplary embodiments. A person skilled in the art will in this case also add individual aspects as improvements or additions to the respective basic form of the invention.

Further advantageous configurations and aspects of the invention are the subject of the dependent claims and of the exemplary embodiments of the invention that are described below. The invention is explained in more detail below on the basis of preferred embodiments with reference to the accompanying figures.

Identical or functionally identical elements have been provided with the same reference signs in the figures, unless stated otherwise.

Figure 1:
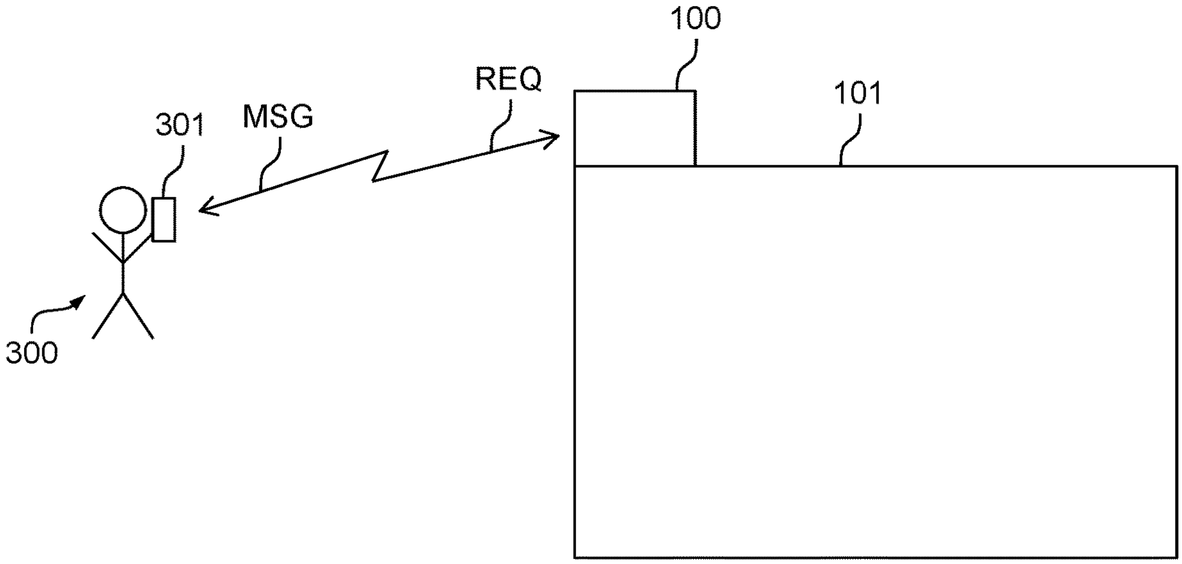
FIG. 1 shows a schematic view of a parking facility with a parking assistance system and a user.

FIG. 1 shows a schematic view of a parking assistance system 100 for a parking facility 101 and a user 300. The parking assistance system 100 comprises, for example, a computing unit and is shown in detail in FIGS. 2 and 3. The parking facility 101 comprises a predetermined area 110 (see FIG. 2 or 3), which comprises a plurality of parking spaces 120 (see FIG. 2 or 3) and a handover area 130 (see FIG. 2 or 3). The parking assistance system 100 is a type 1 and/or type 2 valet parking assistance system, which is set up for use with autonomously driving vehicles or even remotely controllable vehicles. The parking assistance system 100 can be set up for a mixed operation in which both autonomously driving and/or remote-controlled vehicles as well as manually controlled vehicles use the parking facility 101 simultaneously.

The user 300 wishes to use the parking facility 101 at a certain time interval. For this purpose, the user 300 submits a corresponding request REQ to the parking assistance system 100. In this example, the user 300 uses a mobile device 301 for this, such as a smartphone. A reception unit 102 (see FIG. 2 or 3) of the parking assistance system 100, which can be integrated in the computing unit, receives the request REQ. For example, the request REQ is transmitted over a mobile radio network. The request REQ includes at least one desired handover time at which the user 300 wishes to drop off or also collect their vehicle. If the request REQ includes a drop-off time, this preferably additionally includes a planned parking period or a collection time. The specific time interval is determined, in particular, by the handover time. For example, the specific time interval includes the handover time with some buffer before and after the handover time. The buffer includes, for example, a period that is required to control the vehicle from the handover area 130 to a parking space 120 or vice versa. The parking space 120 can be determined here such that the trajectory that the vehicle must travel is also determined, which significantly influences the period.

A determination unit 104 (see FIG. 2 or 3) of the parking assistance system 100, which determination unit can be integrated in the computing unit, takes the handover time as a basis for determining a first expected utilization of the parking facility 101 at the handover time. This is done on the basis of utilization parameters, which are dependent on time, in particular. The utilization parameters comprise an expected number of vehicles using the parking facility 101 and/or moving through the predetermined area 110 in the time interval or a partial interval of the time interval; and/or at least one further received request for the use of the parking facility 101 by another user; and/or a piece of information regarding a type and/or a configuration of a further vehicle using the parking facility 101 and/or moving through the predetermined area 110 in the time interval; and/or a time of day of the handover time; and/or a weather forecast relating to a specific period of time; and/or a public or private event planned within a predetermined period; and/or services booked by other users of the parking facility 101 within the time interval; and/or learned statistics relating to the utilization.

The determination unit 104 may additionally be set up to determine a particular utilization threshold value for the parking facility 101 in the specified time interval. This is done, for example, by way of parameters defined by the infrastructure of the parking facility 101, such as a lane width, a size of the parking spaces and the like, depending on a type and/or a technical configuration of at least one other vehicle using the parking facility 101 and/or located in the predetermined area 110 in the determined time interval, and/or depending on current restrictions and/or restrictions of the parking facility 101 planned in a predetermined period. It can also be said that the utilization threshold value is determined dynamically. As an alternative, the specific utilization threshold value can be fixed.

A comparison unit 106 (see FIG. 2 or 3) of the parking assistance system 100, which comparison unit can be integrated in the computing unit 101, is set up for comparing the determined first expected utilization with the specified utilization threshold value. A comparison result can be specified here in binary form, that is to say it is determined whether the utilization is above or below the threshold value (the case that the utilization is equal to the threshold value can optionally be assigned to one of the two options). As an alternative or in addition, the magnitude of the difference between the expected utilization and the threshold value can be determined as a comparison result.

The determination unit 104 is also set up to determine an alternative handover time depending on the comparison. In the event that the determined first expected utilization is above the specific utilization threshold value, an alternative handover time is determined. In the event that the determined first expected utilization is below the specific utilization threshold value but is, for example, within a predetermined variation interval in relation thereto, an alternative handover time is also preferably determined.

The alternative handover time is determined in such a way that a second expected utilization at the alternative handover time is lower than the first expected utilization. The alternative handover time is particularly preferably determined in such a way that the second expected utilization is lower than or equal to the utilization threshold value.

Figure 4:
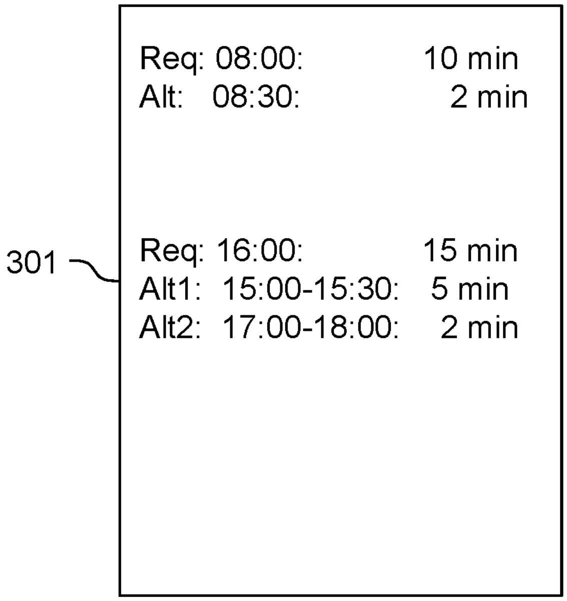
FIG. 4 shows a schematic example of alternative handover times.

The alternative handover time determined in this way is transmitted to the user 300 by means of a message MSG. FIG. 4 shows an example of a mobile device 301 of a user 300, which outputs a corresponding transmitted message with alternative handover times to the user 300 on a display device. In this example, the user 300 sent a request REQ to drop off the vehicle at 8:00 in the morning (drop-off time) and to collect the vehicle at 16:00 in the afternoon (collection time). The drop-off time and the collection time each represent a handover time. At these times, the parking facility 101 is in each case exposed to increased utilization, which is reflected in increased waiting times to be expected. The waiting times to be expected are shown in each case after the corresponding handover times. These are 10 minutes at 8:00 in the morning and 15 minutes at 16:00 in the afternoon. The parking assistance system 100 has therefore determined alternative handover times and their corresponding expected waiting time, and transmitted these to the user 300 using the message MSG. In this example, it was determined that only 2 minutes of waiting time are expected at 8.30 in the morning as an alternative drop-off time. Two alternative time periods were determined for the collection time. In a first alternative time period between 3:00-3.30 in the afternoon, a waiting time of 5 minutes is to be expected and, in a second alternative period between 17:00-18:00 in the afternoon, a waiting time of 2 minutes is to be expected. In response to this message MSG, the user 300 may select one of the alternative handover times for the drop-off time and/or the collection time and/or may request another handover time and/or may insist on the original handover time, where the user 300 must then expect the respective increased waiting time at the handover.

The representation of the alternative handover times and/or the corresponding waiting times can advantageously be highlighted in color. For example, shorter waiting times can be shown in green and longer waiting times can be shown in red. This makes it easier for the user 300 to register the possible benefits by changing the handover time.

It is noted that FIG. 4 is merely an advantageous embodiment. In particular, it is not absolutely necessary to determine absolute waiting times and transmit them using the message. Advantageously, only a qualitative indication of the expected waiting time ("long", "medium", "short") and/or a time saving when selecting an alternative handover time instead of the desired handover time can also be determined and transmitted using the message (for example, "8 minutes" when changing from 8:00 to 8.30 in the morning).

Figure 2:
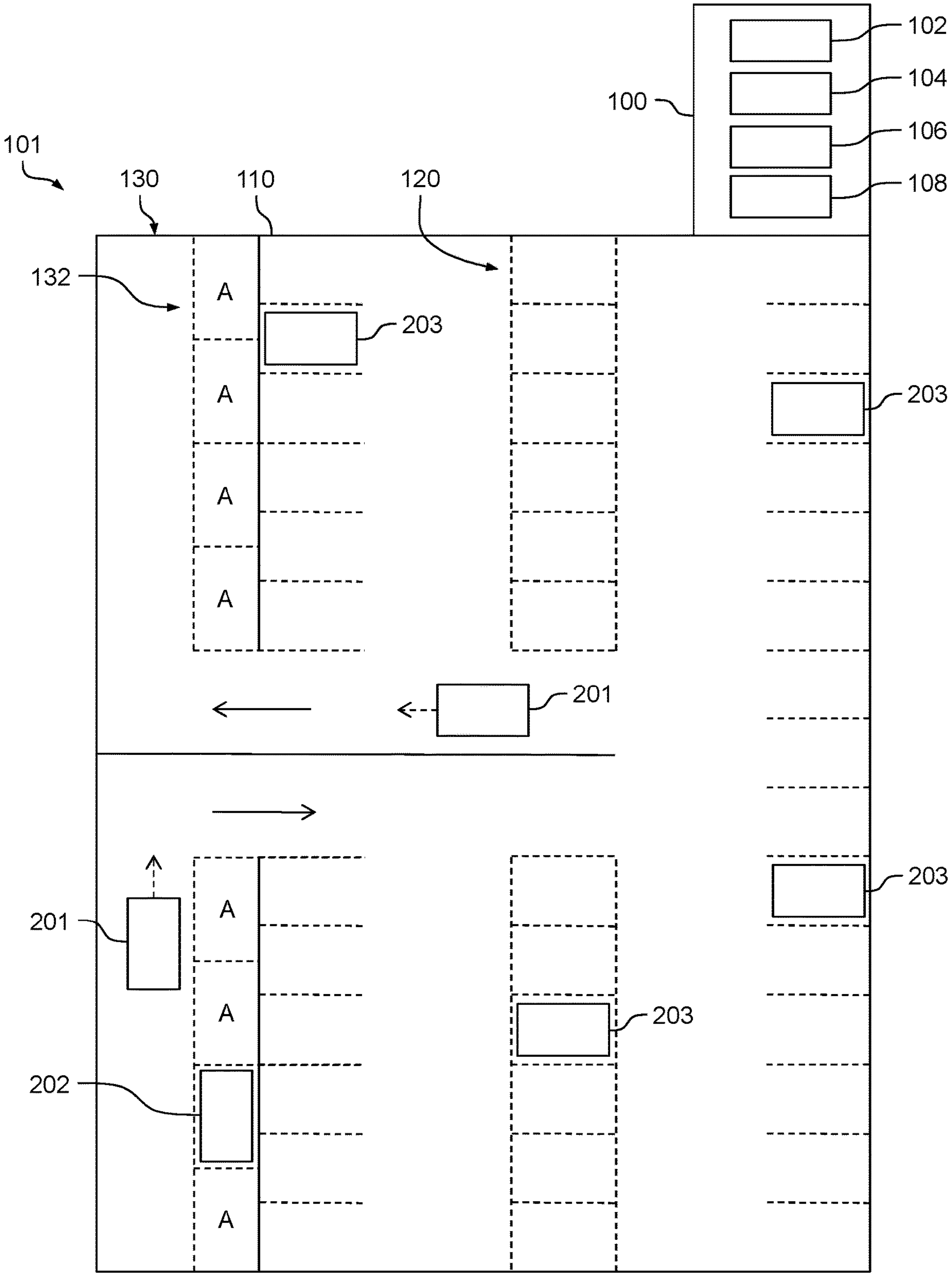
FIG. 2 shows a further schematic view of a parking facility with a parking assistance system at low utilization.
Figure 3:
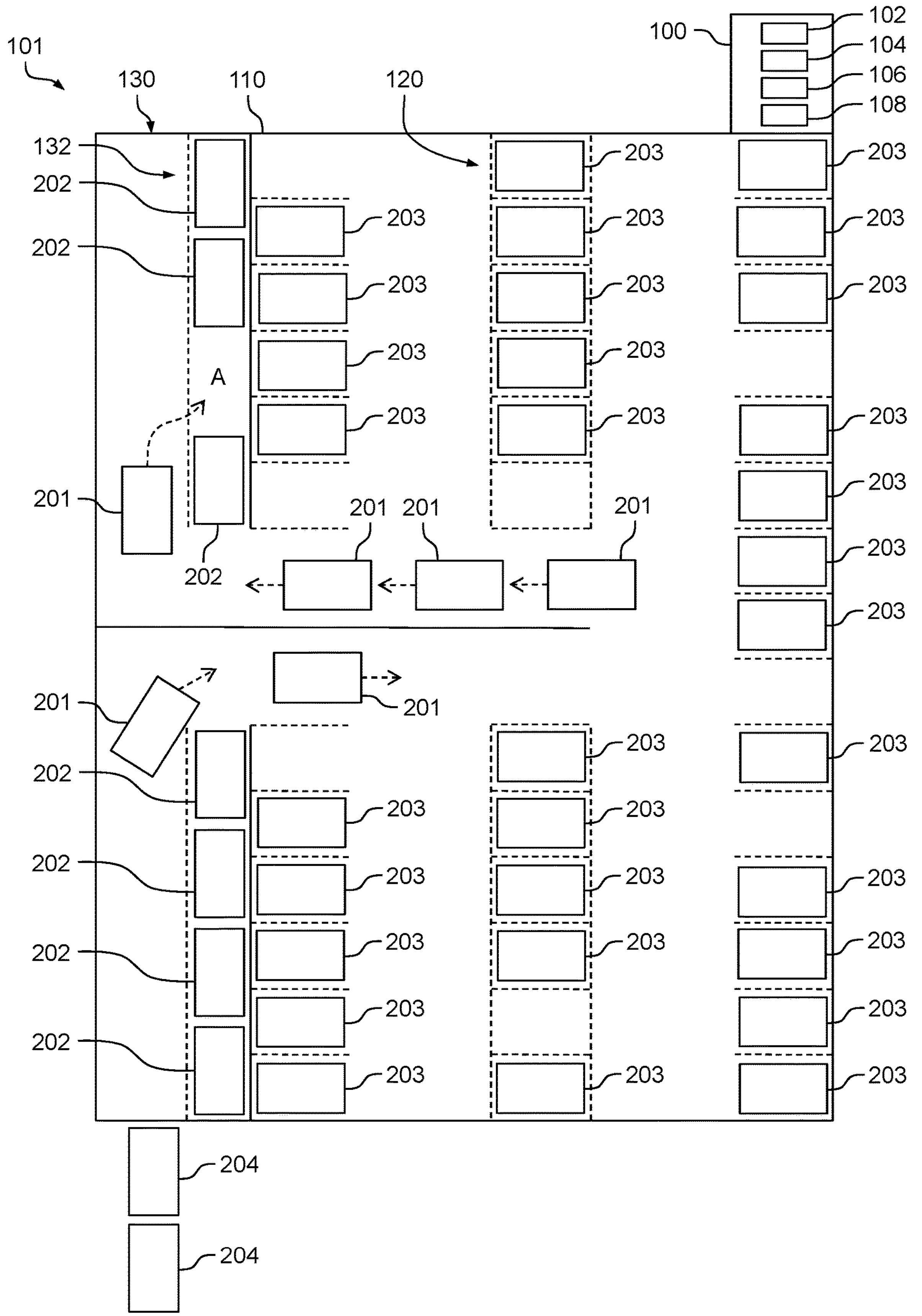
FIG. 3 shows the parking facility of FIG. 2 at high utilization.

FIG. 2 shows a further schematic view of a parking assistance system 100 with a parking facility 101 at low utilization and FIG. 3 shows the same parking assistance system 100 with the parking facility 101 at high utilization or else overload.

The parking assistance system 100 comprises a computing unit 101, which comprises a reception unit 102, a determination unit 104, a comparison unit 106 and a transmission unit 108. These are set up as previously described with reference to FIG. 1. The parking facility 101 comprises a predetermined area 110, which comprises parking spaces 120 and a handover area 130. In this example, the handover area 130 of the parking facility 101 is divided into a drop-off area and a collection area. Each of these areas has four respective handover positions 132 (marked "A"). A handover position 132 is, for example, a parking space where a vehicle 202 is parked for the purpose of handover. This has the advantage that the user 300 (see FIG. 1) is not under time pressure when handing over the vehicle, but can, for example, take personal items or the like out of the vehicle 202 before handing it over. On the other hand, when collecting the vehicle 202, the user 300 can set themselves up in the vehicle, for example, fasten a child in a child seat, load shopping and/or carry out route planning, which the user can do as long as the vehicle 202 is in the handover position 132. In this case, sufficient space is left to the side of the handover positions 132 so that further vehicles 201 can pass and the parking facility 101 is not blocked.

Seven vehicles 201-203 are shown by way of example. Two vehicles 201 are in motion in the situation shown, with one just about to enter the parking facility 101 and one about to leave the parking facility 101. One vehicle 202 is located just at a handover position 132, wherein the user 300 hands over the vehicle 202 straight to the parking assistance system 100. Four vehicles 203 are parked in respective parking spaces of the parking facility 101.

The situation shown in FIG. 2 corresponds to a low utilization of the parking facility 101. Additional vehicles may be present in all areas of the parking facility 101 without this impacting the operation of the parking facility 101. "All areas" include, for example, the drop-off and collection area 132, the parking spaces 120 and also the lane leading through the predetermined area 110. This means that both additional vehicles 201 can currently be in motion, additional vehicles 202 can currently be in handover and additional vehicles 203 can be parked.

The vehicles 201, 202, 203, 204 (see FIG. 3) are, for example, passenger cars, emergency vehicles, trucks or the like. The vehicles 202, which are handed over by their respective users 300 to the parking assistance system 100, are either autonomously driving vehicles, which have a number of sensor units set up for detecting the driving status of the vehicle and for detecting an environment of the vehicle. Examples of such sensor units of the vehicle are image capture devices, such as a camera, a radar (radio detection and ranging) or a lidar (light detection and ranging), ultrasonic sensors, location sensors, wheel angle sensors and/or wheel speed sensors. The sensor units are each configured to output a sensor signal, for example to a driver assistance system which carries out the semi-autonomous or fully autonomous driving on the basis of the detected sensor signals. As an alternative or in addition, the vehicles 202 may be set up to be remotely controlled by the parking assistance system 100, provided that the parking assistance system 100 is set up accordingly (type 2 valet parking assistance system).

The situation shown in FIG. 3 corresponds to a very high utilization of the parking facility 101, since almost all parking spaces 120 are occupied here, a larger number of vehicles 201 moves in the predetermined area 110 and partially block each other in the process, which leads to a traffic jam, and almost all handover positions 132 are occupied by vehicles 202. In addition, a number of additional vehicles 204 are already in a queue in front of an entrance to the parking facility 101.

The expected utilization of the parking facility 101 in a particular time interval can be estimated on the basis of the utilization parameters. The utilization parameters are particularly variable in terms of time, such that different expected utilization rates can be determined for different periods of time. For example, some utilization parameters are cyclic, where a cycle can include a day (time of day), a week (day of the week), or even a year. Other utilization parameters are dependent on events, with examples of events including holidays, vacations, scheduled events, and so on.

In order to avoid a situation as illustrated in FIG. 3 as far as possible, alternative handover times can be proposed to a user as described above with reference to FIG. 1 and FIG. 4, in particular when the expected utilization at the desired handover time is above a particular utilization threshold value.

The utilization threshold value can also be variable in terms of time. In particular, the utilization threshold value may depend on restrictions of the parking facility 101 due to planned construction measures and/or repairs or the like. A separate utilization threshold value can be determined for each of the areas of the parking facility 101 (for example, the drop-off and collection area 132, the parking spaces 120 and also the lane leading through the predetermined area 110) and the expected utilization can also be determined separately for each of these areas. In particular, the respective expected utilization is then compared with the corresponding utilization threshold value.

Figure 5:
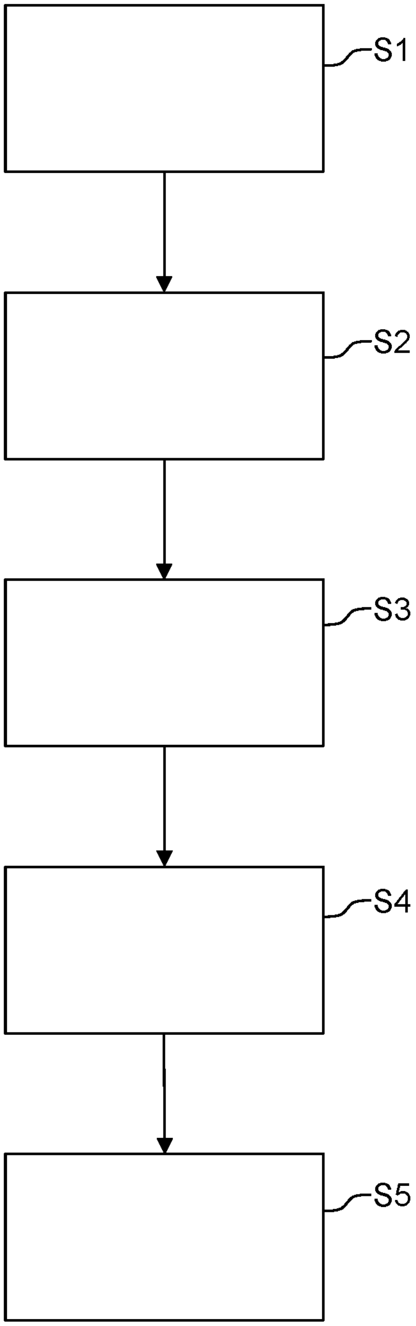
FIG. 5 shows a schematic block diagram of an exemplary embodiment of a method for operating a parking assistance system.

FIG. 5 shows a schematic block diagram of an embodiment for a method for operating a parking assistance system 100 for a parking facility 101, for example the parking assistance system 100 from one of FIG. 1-3 and the parking facility 101 shown in FIG. 2. In a first step S1, a request REQ (see FIG. 1) for the use of the parking facility 101 is received in a certain time interval from the user 300 of the vehicle 202 (see FIG. 2 or 3), the request REQ comprising at least one handover time. In a second step S2, a first expected utilization of the parking facility 101 is determined at the handover time depending on a number of utilization parameters. In a third step S3, the determined first estimated utilization is compared with a specific utilization threshold value. In a fourth step S4, an alternative handover time is determined as a function of the comparison, wherein the alternative handover time is determined in such a way that a second expected utilization at the alternative handover time is lower than the first expected utilization and/or lower than or equal to the specified utilization threshold value. In a fifth step S5, a message MSG (see FIG. 1) comprising the alternative handover time is transmitted to the user 300.

Although the present invention has been described on the basis of exemplary embodiments, it may be modified in diverse ways.

LIST OF REFERENCE SIGNS

100 parking assistance system
101 parking facility
102 reception unit
104 determination unit
106 comparison unit
108 transmission unit
110 predetermined area
120 parking spaces
130 handover area
132 handover position
201 vehicle
202 vehicle
203 vehicle
204 vehicle
300 user
301 mobile device
MSG message
REQ request
S1 method step
S2 method step
S3 method step
S4 method step
S5 method step

The invention claimed is:

1. A method for operating a parking assistance system for a parking facility, wherein the parking facility provides in a predetermined area several parking spaces for autonomously driving vehicles and comprises a handover area for handing over a vehicle from a user to the parking assistance system or vice versa, wherein the parking assistance system is configured to control the vehicle between the handover area and the predetermined area, the method comprising:

receiving, by a reception unit integrated in a computing unit and via a communication network, a request for the use of the parking facility in a specific time interval from the user of the vehicle, wherein the request includes at least one handover time at which the user wishes to drop off or collect the vehicle, determining, by a determination unit integrated in the computing unit, a first expected capacity utilization of the parking facility at the handover time as a function of a number of utilization parameters, comparing, by a comparison unit integrated in the computing unit, the determined first expected capacity utilization with a particular utilization threshold value, determining, by the computing unit, an alternative handover time for dropping off or collecting the vehicle as a function of the comparison, wherein the alternative handover time is determined in such a way that a second expected capacity utilization of the parking facility at the alternative handover time is lower than the first expected capacity utilization or lower than or equal to the particular utilization threshold value, and transmitting, by a transmission unit integrated in the computing unit and via the communication network, a message comprising the alternative handover time to the user.

2. The method as claimed in claim 1, further comprising:

determining an expected handover period, which is an expected period for handing over the vehicle from the user to the parking assistance system or vice versa at the handover time, depending on the determined first expected capacity utilization, wherein the message additionally comprises the determined expected handover period.

3. The method as claimed in claim 2, further comprising:

determining an alternative expected handover period, which is an expected period for handing over the vehicle from the user to the parking assistance system or vice versa at the determined alternative handover time, depending on the determined second expected capacity utilization, wherein the message additionally comprises the determined alternative expected handover period.

4. The method as claimed in claim 3, further comprising:

determining a difference between the determined expected handover period and the determined alternative expected handover period, wherein the message additionally comprises the determined difference or only comprises the alternative handover time and the determined difference.

5. The method as claimed in claim 1, wherein the utilization parameters comprise:

an expected number of vehicles using the parking facility and/or moving through the predetermined area in the time interval or a partial interval of the time interval;

at least one further received request for the use of the parking facility by another user;

a piece of information regarding a type and/or a configuration of a further vehicle using the parking facility and/or moving through the predetermined area in the time interval;

a time of day of the handover time;

a weather forecast relating to a specific period of time;

a public or private event planned within a predetermined period;

services booked by other users of the parking facility within the time interval; and learned statistics relating to historic utilization.

6. The method as claimed in claim 1, wherein the utilization threshold value is determined dynamically depending on:

parameters defined by the infrastructure of the parking facility, a type and/or a technical configuration of at least one other vehicle using the parking facility or located in the predetermined area-in the specified time interval, and current restrictions or restrictions of the parking facility planned in a predetermined period.

7. The method as claimed in claim 1, wherein the utilization threshold value corresponds to a utilization of the parking facility in which an average speed of vehicles using the parking facility or moving through the predetermined area is lower than a predetermined speed.

8. The method as claimed in claim 1, wherein the request for the use of the parking facility comprises:

at least one drop-off time and a parking period or a drop-off time and a collection time.

9. The method as claimed in claim 1, wherein the request for the use of the parking facility comprises a piece of information relating to a type or a technical configuration of the vehicle.

10. The method as claimed in claim 1, further comprising:

receiving a new request from the user in response to the transmission of the message to the user, wherein the new request comprises a different handover time to the first request.

11. A non-transitory computer readable medium comprising instructions that, when the program is executed by a computer, cause the computer to perform the method as claimed in claim 1.

12. The method as claimed in claim 1, wherein the parking assistance system is a type 2 valet parking assistance system comprising a plurality of sensor units arranged in the predetermined area for detecting the vehicles present in the predetermined area and for outputting a respective sensor signal, and wherein the parking assistance system comprises a control unit set up for remote control of a vehicle based on the sensor signals output by the sensor units.

13. The method as claimed in claim 1, wherein the parking assistance system is a type 1 valet parking assistance system comprising a plurality of optically detectable and clearly distinguishable markers arranged at certain positions in the predetermined area, wherein the markers are able to be used for position determination by an autonomously driving vehicle during an autonomous journey within the predetermined area.

14. A parking assistance system for a parking facility, wherein the parking facility provides in a predetermined area several parking spaces for autonomously driving vehicles and comprises a handover area for handing over a vehicle from a user to the parking assistance system or vice versa, wherein the parking assistance system is configured to control the vehicle between the handover area and the predetermined area, and wherein the parking assistance system comprises:

a reception unit integrated in a computing unit, for receiving via a communication network a request for the use of the parking facility in a specific time interval from the user of the vehicle, wherein the request comprises at least one handover time at which the user wishes to drop off or collect the vehicle, a determination unit integrated in the computing unit, for determining a first expected capacity utilization of the parking facility at the handover time as a function of a number of utilization parameters, a comparison unit integrated in the computing unit, for comparing the determined first expected capacity utilization with a particular utilization threshold value, wherein the determination unit is additionally set up to determine an alternative handover time for dropping off or collecting the vehicle as a function of the comparison, wherein the alternative handover time is determined in such a way that a second expected capacity utilization of the parking facility at the alternative handover time is lower than the first expected capacity utilization or lower than or equal to the utilization threshold value, and a transmission unit integrated in the computing unit, for transmitting via the communication network a message comprising the alternative handover time to the user.

15. A parking facility, wherein the parking facility provides in a predetermined area several parking spaces for autonomously driving vehicles and comprises a handover area for handing over a vehicle from a user to a parking assistance system or vice versa, wherein the parking assistance system is designed as claimed in claim 14.

16. The parking facility as claimed in claim 15, wherein the parking assistance system is a type 2 valet parking assistance system and comprises a plurality of sensor units arranged in the predetermined area for detecting the vehicles present in the predetermined area and for outputting a respective sensor signal, and wherein the parking assistance system comprises a control unit set up for remote control of a vehicle based on the sensor signals output by the sensor units.

17. The parking facility as claimed in claim 15, wherein the parking assistance system is a type 1 valet parking assistance system and comprises a plurality of optically detectable and clearly distinguishable markers arranged at certain positions in the predetermined area, wherein the markers are able to be used for position determination by an autonomously driving vehicle during an autonomous journey within the predetermined area.

* * * * *